(12) United States Patent
Ries et al.

(10) Patent No.: US 6,219,313 B1
(45) Date of Patent: Apr. 17, 2001

(54) SYSTEM AND METHOD FOR ADAPTIVE CARTRIDGE ENGAGEMENT IN AN AUTOMATED CARTRIDGE LIBRARY

(75) Inventors: James L. Ries, Boulder; Terry L. Lane, Longmont, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/234,000

(22) Filed: Jan. 19, 1999

(51) Int. Cl.$^7$ .................................................. G11B 17/22
(52) U.S. Cl. ........................... 369/34; 700/218; 700/259; 414/275
(58) Field of Search ................................. 369/34, 36, 37, 369/38, 39, 178; 300/92; 700/218, 215, 259; 414/807, 275, 280, 331.05, 331.11

(56) References Cited

U.S. PATENT DOCUMENTS

| | | |
|---|---|---|
| 4,300,661 | 11/1981 | Hmelovsky . |
| 4,694,229 | 9/1987 | Cormack . |
| 4,714,867 | 12/1987 | Palmin et al. . |
| 4,846,619 | 7/1989 | Crabtree et al. . |
| 4,984,108 | 1/1991 | Grant et al. . |
| 5,040,159 | 8/1991 | Oliver et al. . |
| 5,134,600 | 7/1992 | Oliver et al. . |
| 5,164,928 * | 11/1992 | Oliver et al. ........................... 369/34 |
| 5,231,616 * | 7/1993 | Oliver et al. ........................... 369/34 |
| 5,287,459 * | 2/1994 | Gniewek ................................ 369/34 |
| 5,303,034 | 4/1994 | Carmichael et al. . |
| 5,323,327 * | 6/1994 | Carmichael et al. ........... 364/478.03 |
| 5,331,232 | 7/1994 | Moy et al. . |
| 5,428,587 * | 6/1995 | Wanger et al. ......................... 369/30 |
| 5,532,931 | 7/1996 | Erickson, Jr. et al. . |
| 5,622,470 | 4/1997 | Schaefer et al. . |
| 5,692,623 | 12/1997 | Todor et al. . |
| 5,790,338 | 8/1998 | Kanai et al. . |

* cited by examiner

*Primary Examiner*—Tan Dinh
(74) *Attorney, Agent, or Firm*—Brooks & Kushman P.C.

(57) ABSTRACT

A system and method of adaptively engaging cartridges stored in an automated cartridge library are provided. Upon receiving a request to extend a reach mechanism of a robot arm to engage a cartridge stored in a selected cell, a library controller initiates a move profile to extend the reach mechanism from a starting position toward the cartridge. The move profile comprises a set of commanded positions and corresponding commanded velocities. A motor controller in communication with the library controller compares a sensed position of the reach mechanism, provided by a position feedback sensor associated with a reach motor, with the commanded position to determine a position error. The motor controller maintains the move profile until the position error exceeds an error threshold, indicating engagement of the cartridge by the reach mechanism. The move profile is then terminated to obtain a final position of the reach mechanism, where the final position reflects a specific depth of the selected cell from the robot arm.

20 Claims, 4 Drawing Sheets

SYSTEM AND METHOD FOR ADAPTIVE CARTRIDGE ENGAGEMENT IN AN AUTOMATED CARTRIDGE LIBRARY

TECHNICAL FIELD

This invention relates to a system and method for adaptively engaging cartridges stored in an automated cartridge library.

BACKGROUND ART

Automated cartridge libraries store and manage large numbers of data cartridges, typically containing magnetic tape on which data is recorded. These libraries are comprised of arrays of storage cells, each cell typically being formed to contain a single data cartridge. The arrays each hold a plurality of data cartridges, and each data cartridge typically has some kind of identifying information, such as a label or bar code. A robot arm, having an optical system for selecting cartridges, is operable to locate a selected storage cell and use an associated reach mechanism to retrieve a data cartridge from the selected cell.

The storage cells are preferably constructed with exact dimensions that correspond to the size of the cartridges, since the cartridges must be positioned in a precise manner if the robotic arm is to grasp them correctly. However, mechanical frame and robot arm tolerances are large enough to cause significant variation in the cell depth within a given library, where cell depth is defined as the distance from the robot arm to the face of a cartridge stored in a particular cell. As a result, it is difficult for the reach mechanism to always extend a specific distance and be assured of reliably engaging a cartridge.

A few prior art systems have addressed the problem of cell depth variation. For example, U.S. Pat. No. 5,040,159 issued to Oliver et al. discloses an optical disk handling system which uses a controller to simultaneously control the position of the reach mechanism and to monitor the force exerted by the motor via shaft encoders and motor current and voltage feedback. The reach mechanism is moved toward a cartridge until a specified force exerted by the motor is encountered, indicating engagement with the cartridge.

As another example, U.S. Pat. No. 5,790,338 issued to Kanai et al. discloses a library apparatus having a photosensor mounted to the tip of the reach mechanism. A robot controller calculates the position of the selected cell and moves the reach mechanism to the calculated position in a coarse control. Then, a target element relating to the selected cell is detected based on the signal from the photosensor. A position recognition controller determines the displacement of the actual position of the selected cell from the calculated position, causing the robot controller to further position the reach mechanism in fine control.

Although the above systems do provide solutions to accommodating variable cell depth within an automated storage library, these solutions are overly complex, costly, and may be susceptible to failure.

Therefore, a need exists for a system and method of adaptive cartridge engagement that reduces the complexity of the control systems and associated software, eliminates the need for multiple sensors mounted on the moving reach mechanism which are subject to dust and flexible cabling failures, and increases the reliability of cartridge engagement by the reach mechanism.

DISCLOSURE OF INVENTION

Therefore, it is an object of the present invention to provide a system and method for cartridge engagement in an automated cartridge library that accounts for variance in cell depths within a given library.

It is another object of the present invention to provide a system and method for adaptively engaging cartridges that do not require complex control systems and software for reliable cartridge engagement.

It is a further object of the present invention to provide a system and method for adaptive cartridge engagement that do not require multiple sensors mounted on the moving reach mechanism.

It is a still further object of the present invention to provide a system and method of adaptively engaging cartridges that reduces product and assembly costs.

Accordingly, a method for adaptively engaging cartridges stored in cells within an automated cartridge library is provided. The method includes receiving a request to extend a reach mechanism of a robot arm to engage a cartridge stored in a selected cell. Next, the method includes initiating a move profile to extend the reach mechanism from a starting position toward the cartridge, where the move profile comprises a set of commanded positions and corresponding commanded velocities. The method further includes comparing a sensed position of the reach mechanism with the commanded position to determine a position error. The move profile is maintained until the position error exceeds an error threshold. The move profile is then terminated to obtain a final position of the reach mechanism, where the final position reflects a specific depth of the selected cell from the robot arm.

In a preferred embodiment, the method further includes determining if appropriate calibrated depth information is available for the selected cell. If not, a nominal move profile is initiated, where the nominal move profile is preferably selected from a plurality of profiles based on the properties of the cartridge to be engaged. If appropriate calibrated depth information is available for the selected cell, a calibrated move profile is initiated. The move profile preferably includes a constant stall velocity at which it is deemed safe to encounter the cartridge. Once the move profile is terminated, the method preferably includes determining if the final position is within a predetermined tolerance range. If so, the final position is saved in a database. If not, an error condition is preferably reported.

To carry out the method of the present invention, an automated cartridge library capable of adaptive cartridge engagement is provided. The library includes a housing having a plurality of storage cells located therein, where each cell is formed to hold a data cartridge. A robot arm is actuable within the housing, the robot arm having a reach mechanism for extending toward a selected cell. A motor is associated with the reach mechanism and is operable to extend the reach mechanism toward the selected cell. The motor has a position feedback sensor, such as a position encoder, for determining a sensed position of the reach mechanism. A library controller is operable to receive a request to extend the reach mechanism to engage a cartridge stored in the selected cell and to initiate a move profile to extend the reach mechanism from a starting position toward the cartridge, where the move profile comprises a set of commanded positions and corresponding commanded velocities. A motor controller in communication with the library controller is operable to compare the sensed position of the reach mechanism with the commanded position to determine a position error and maintain the move profile until the position error exceeds an error threshold. The motor controller is further operable to terminate the move profile to obtain a final position of the reach mechanism, wherein the final position reflects a specific depth of the selected cell from the robot arm. In a preferred embodiment, the library controller further includes a database for storing cell depth information.

The above objects and other objects, features, and advantages of the present invention are more readily understood from a review of the attached drawings and the accompanying specification and claims.

BEST MODE FOR CARRYING OUT THE INVENTION

The system and method of the present invention address the problem of variation in cell depths within an automated cartridge library by allowing the final position of a robot arm reach mechanism to vary according to the specific cell to be accessed. Instead of automatically extending the reach mechanism a specified distance to engage a cartridge stored within a selected cell, the reach mechanism is commanded to extend until it is determined that a cartridge has been encountered. Using the system and method of the present invention, variability in cell depths within an automated cartridge library can be accommodated while providing reliable cartridge engagement at a low complexity and cost.

Figure 1:
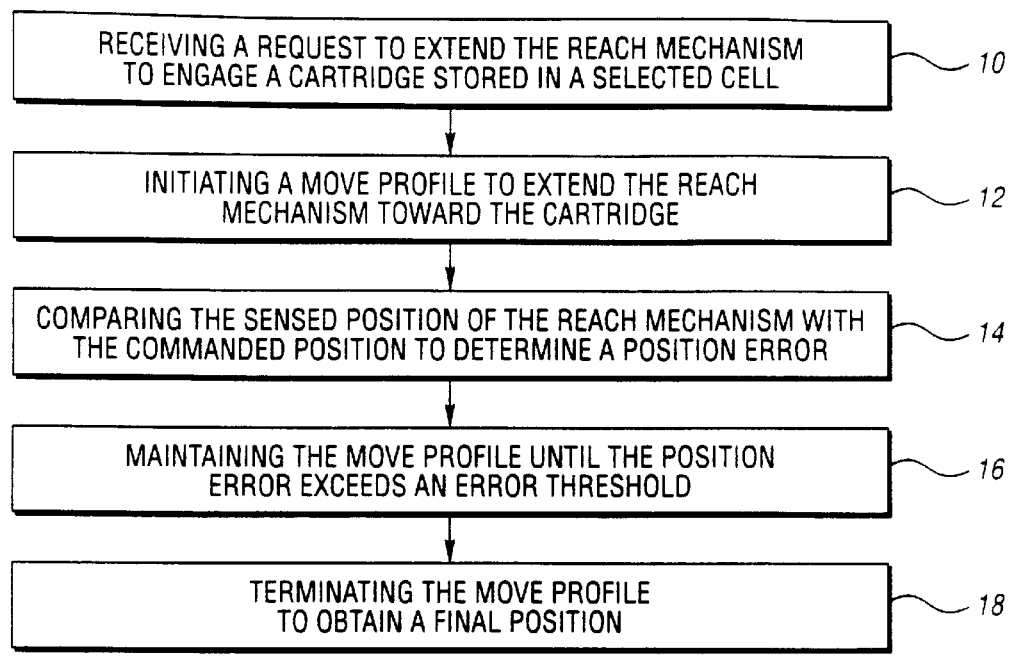
FIG. 1 is a block diagram outlining the method of the present invention.

Referring first to FIG. 1, the method of adaptive cartridge engagement of the present invention is outlined. The method includes receiving a request to extend the reach mechanism to engage a cartridge stored in a selected cell, as shown in block 10, and initiating a move profile to extend the reach mechanism toward the cartridge, as shown in block 12. Referring to block 14, the method further includes comparing a sensed position of the reach mechanism with the commanded position to determine a position error, and maintaining the move profile until the position error exceeds an error threshold, as shown in block 16. Lastly, as shown in block 18, the method includes terminating the move profile to obtain a final position of the reach mechanism, where the final position reflects a specific depth of the selected cell from the robot arm.

Figure 2:
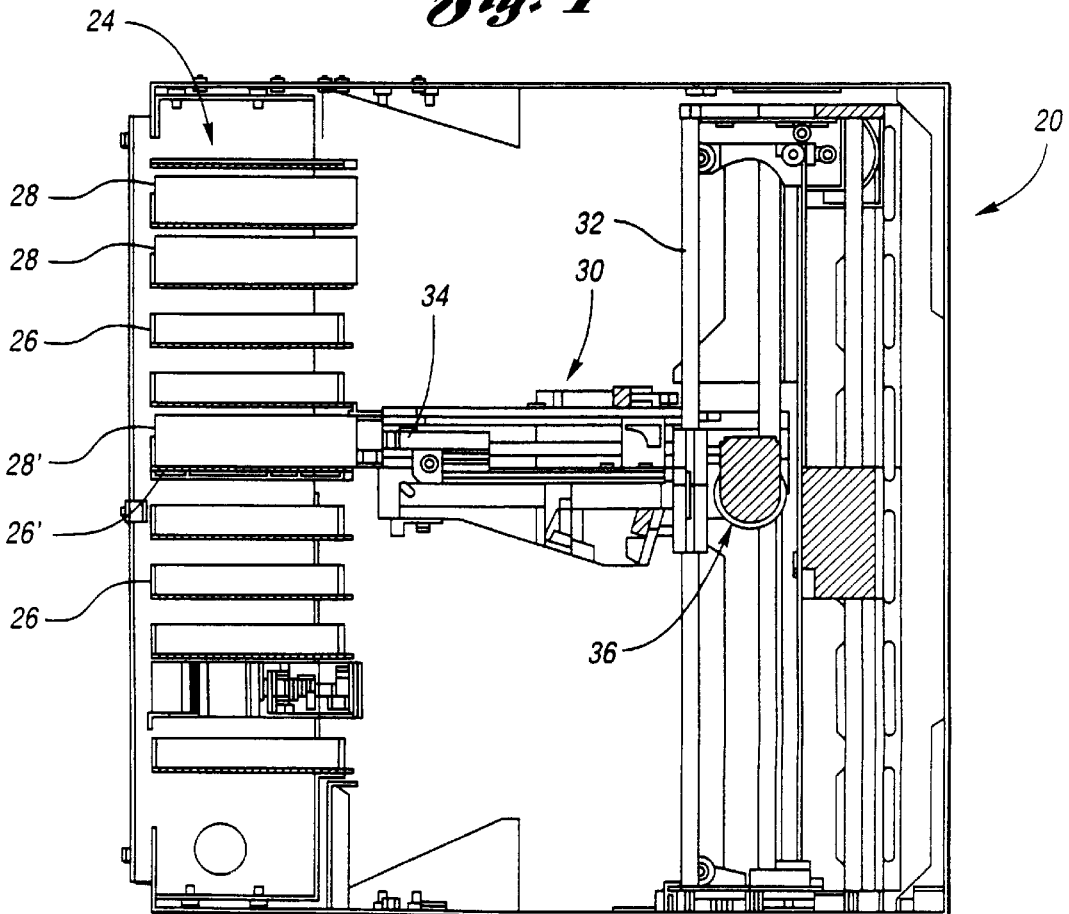
FIG. 2 is a sectional view of an automated cartridge library.

The method of the present invention relates to the operation of an automated cartridge library, indicated generally by reference numeral 20 in FIG. 2. Automated cartridge library 20 is provided with a suitable housing 22 to ensure operator safety and data security. Library 20 typically comprises a plurality of arrays 24, of which only one array 24 is shown in FIG. 2 for simplicity. Each array 24 consists of a plurality of individual storage cells 26 which are sized to hold data cartridges 28. Although housing 22 is depicted herein to be rectangular, the present invention applies equally well to automated cartridge libraries utilizing other housing structures and storage configurations.

Still referring to FIG. 2, arrays 24 are mounted adjacent to an actuator, such as a robot arm 30. Robot arm 30 is actuable within housing 22, and preferably can be positioned vertically along a rod 32 as well as angularly in order to access different cells 26. Robot arm 30 includes a reach mechanism 34 operable to extend toward a selected cell 26' to engage a cartridge 28' stored therein. A motor 36 associated with reach mechanism 34 is used to accomplish this motion. Motor 36 is provided with a position feedback sensor, such as a position encoder 37 (illustrated schematically in FIG. 3), which is operable to provide a sensed position of reach mechanism 34 at any time during its motion. Advantageously, position encoder 37 need not move with reach mechanism 34 in order to sense its position.

Figure 3:
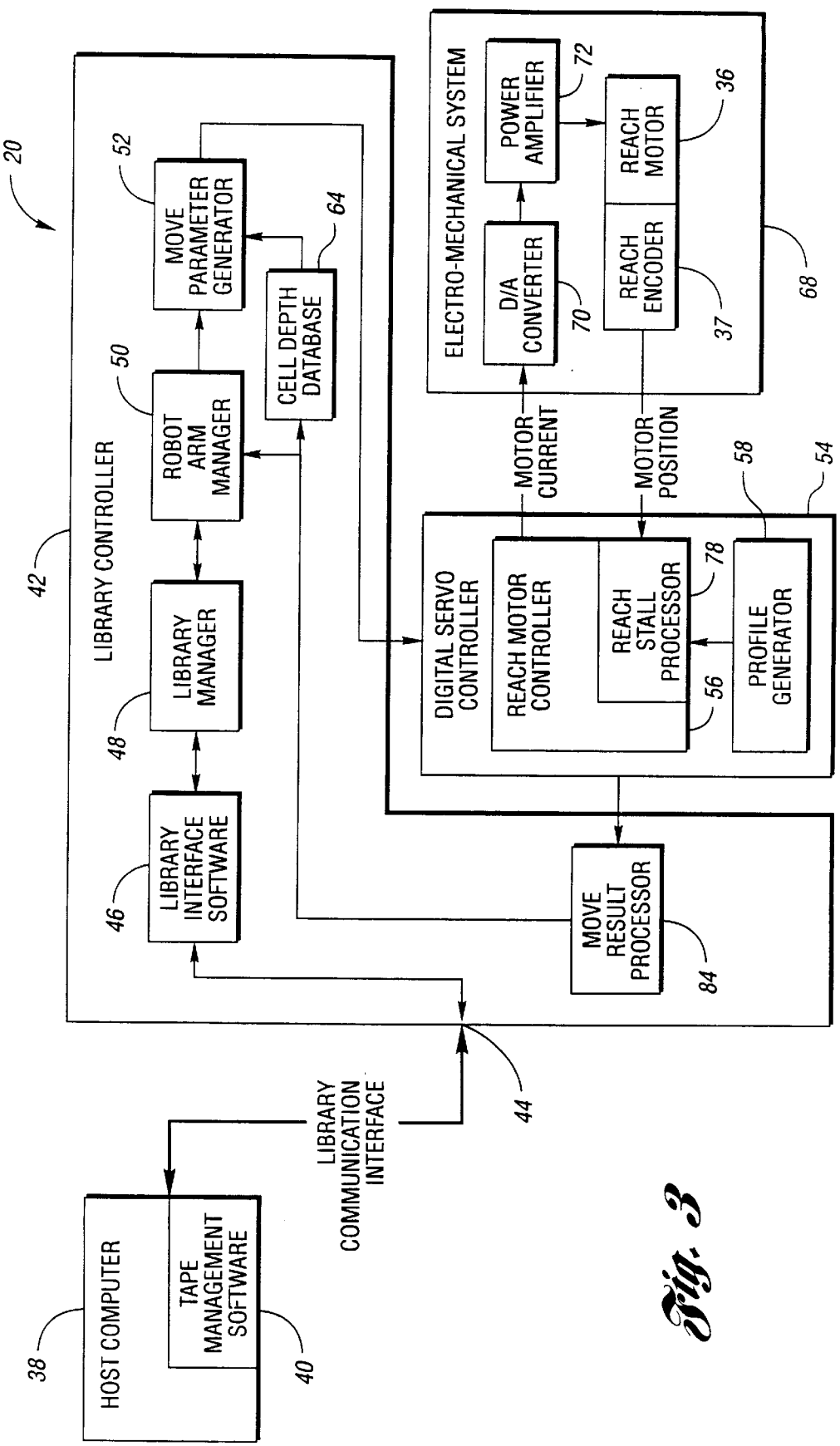
FIG. 3 is a schematic illustration of the system of the present invention.

Referring next to FIG. 3, the operation of automated cartridge library 20 is directed by a processor, such as a host computer 38. Host computer 38 utilizes tape management software 40 to communicate with a library controller 42 at a library communication interface 44. In overview, library controller 42 interprets signals from host computer 38 and provides appropriate signals to robot arm 30 and associated reach mechanism 34 to control their motion and operation.

Library controller 42 has several modules. A library interface software module 46 receives a command from host computer 38, decodes the command, and sends the command to a library manager 48. In the case where the command is a move command involving robot arm 30, library manager 48 preferably verifies that the move can be accomplished, such as by checking to see that selected source cell 26' is full and a desired destination cell is empty.

After verifying the move command information, library manager 48 sends the move command to a robot arm manager 50. To accomplish the move, robot arm manager 50 first determines the vertical and angular positions to which robot arm 30 should be positioned in order to be aligned with selected cell 26'. An example of a system used for such robot arm alignment can be found in U.S. Pat. No. 5,303,034 issued to Carmichael et al. The system and method of the present invention deal with engaging cartridge 28' after robot arm 30 is aligned properly.

At this point, robot arm manager 50 routes the move command to a move parameter generator module 52. Module 52 determines the appropriate move parameters for reach mechanism 34 to accomplish the move command, and passes these parameters to a digital servo-controller system 54. Servo-controller 54 includes a reach motor controller 56 and a profile generator 58. Using the move parameters passed from move parameter generator 52, profile generator 58 constructs a move profile for reach mechanism 34 and communicates this information to reach motor controller 56.

Figure 4A:
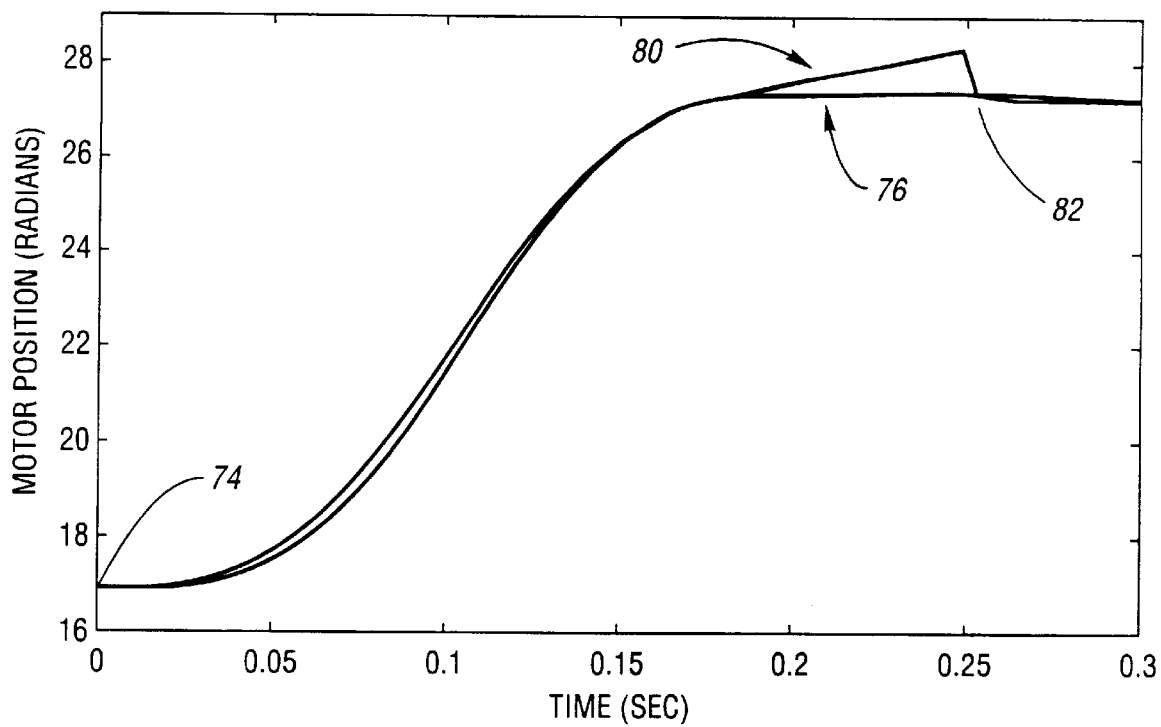
FIGS. 4a and 4b are graphs depicting a set of commanded positions and corresponding commanded velocities, respectively, for a typical move profile of the reach mechanism.
Figure 4B:
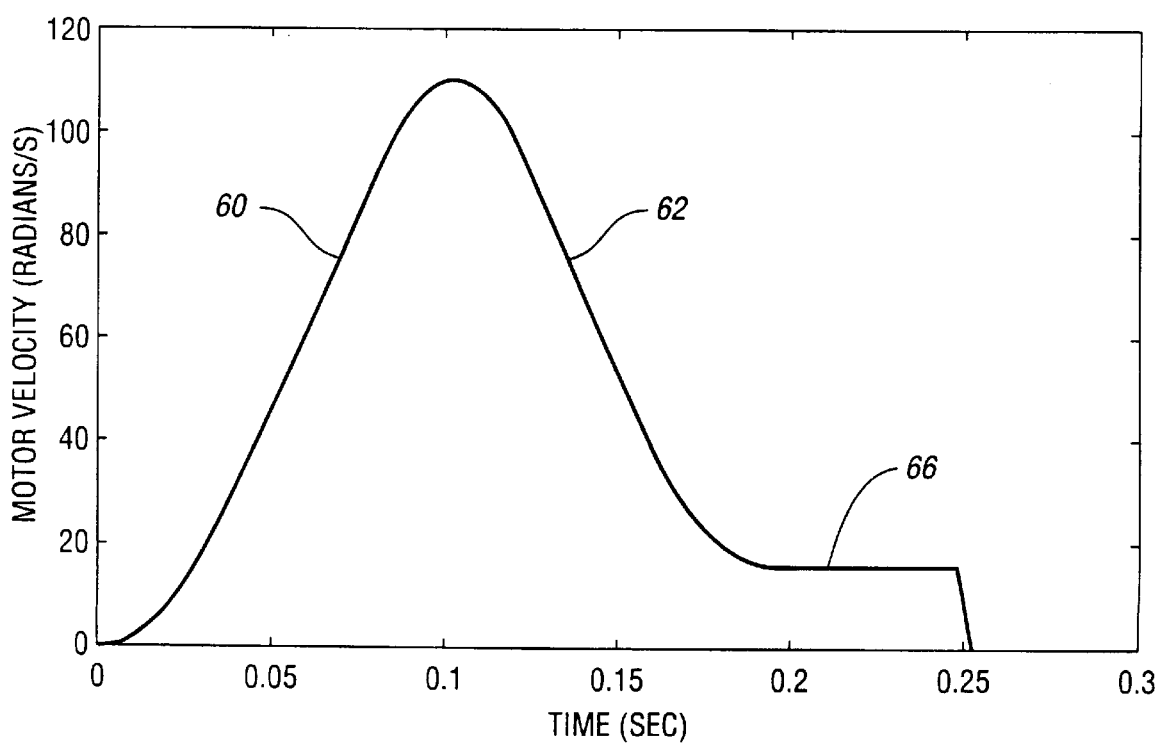

As shown in FIG. 4, the move profile has two components, a set of commanded positions (FIG. 4a) and corresponding commanded velocities (FIG. 4b). The set of commanded velocities may include an acceleration phase 60, or an acceleration phase 60 followed by a deceleration phase 62, as depicted in the example profile of FIG. 4b. The use of acceleration phase 60 only may be preferable when the cell depth from robot arm 30 is quite small, and there is not enough distance through which to accomplish an acceleration-deceleration type profile. For longer cell depths, an acceleration-deceleration profile is preferred due to its greater time efficiency.

Depending on the type of library 20, reach mechanism 34 expects to encounter cartridge 28' at a nominal distance plus or minus some mechanical tolerance. Therefore, a nominal move profile is generated by profile generator 58 based on the nominal mechanical dimensions of the type of library 20 in which the reach move is to occur. Preferably, the cartridge type information, which is obtained from an optical decode of the cartridge label by robot arm 30, is also used to define the nominal move profile. In this embodiment, a plurality of nominal move profiles preferably exist which each correspond to a specific library 20 and cartridge 28' type.

Alternatively, calibrated move profiles can be generated if appropriate cell depth information is available for selected cell 26'. Specifically, if selected cell 26' has been accessed previously, accurate cell depth information will already exist. This information is stored in a cell depth database 64 (FIG. 3) provided in library controller 42, as is discussed in greater detail below, and can be used by profile generator 58 to construct a calibrated move profile for selected cell 26'. However, there may be times when this stored cell depth information may not be appropriate for use during subsequent accesses of selected cell 26'. For example, in the case where cartridges 28 of different types, and therefore different dimensions, are stored in library 20, and the type of cartridge 28' currently stored in selected cell 26' cannot be determined, stored cell depth information would not be used and a nominal move profile would alternatively be chosen.

Regardless of whether a nominal move profile or calibrated move profile is chosen, the set of commanded velocities preferably includes a period of constant velocity termed a stall velocity 66 as reach mechanism 34 approaches cartridge 28' (FIG. 4b). The stall velocity is a velocity at which it has been determined to be safe for reach mechanism 34 to make contact with cartridge 28'. The stall velocity 66 can be an inherent part of the move profile, or can be commanded during the move profile by reach motor controller 56. In the latter case, once the commanded velocity becomes equal to the stall velocity 66, reach motor controller 56 commands reach motor 36 to maintain the stall velocity 66 for the duration of the reach move.

To actuate reach mechanism 34, servo-controller 54 communicates with an electromechanical system 68 containing reach motor 36. Reach motor controller 56 sends current commands to reach motor 36, typically via a D/A converter 70 and a power amplifier 72, to move reach mechanism 34 from a starting position 74 (FIG. 4a) toward cartridge 28'. Position encoder 37 provides feedback to servo-controller 54 at fixed intervals regarding a sensed position 76 of reach mechanism 34. Reach motor controller 56 is further provided with a stall processor 78 which compares the sensed position 76 with the commanded position 80 to determine a position error. When stall processor 78 determines that the position error has exceeded a predetermined error threshold, engagement of reach mechanism 34 with cartridge 28' is indicated. In a preferred embodiment, engagement of cartridge 28' occurs with reach mechanism 34 moving at stall velocity 66.

At this point, the move profile is terminated and a final position 82 is obtained. A move result processor module 84 of library controller 42 preferably verifies that final position 82 is within a predetermined tolerance range. If so, final position 82, which reflects the specific depth of selected cell 26' from robot arm 30, is entered into cell depth database 64. Entering the specific depth can overwrite a previous depth, such as a nominal depth, or be saved in addition to a previous depth. If final position 82 is not within the acceptable tolerance range, library controller 42 preferably reports an error to host computer 38.

Figure 5:
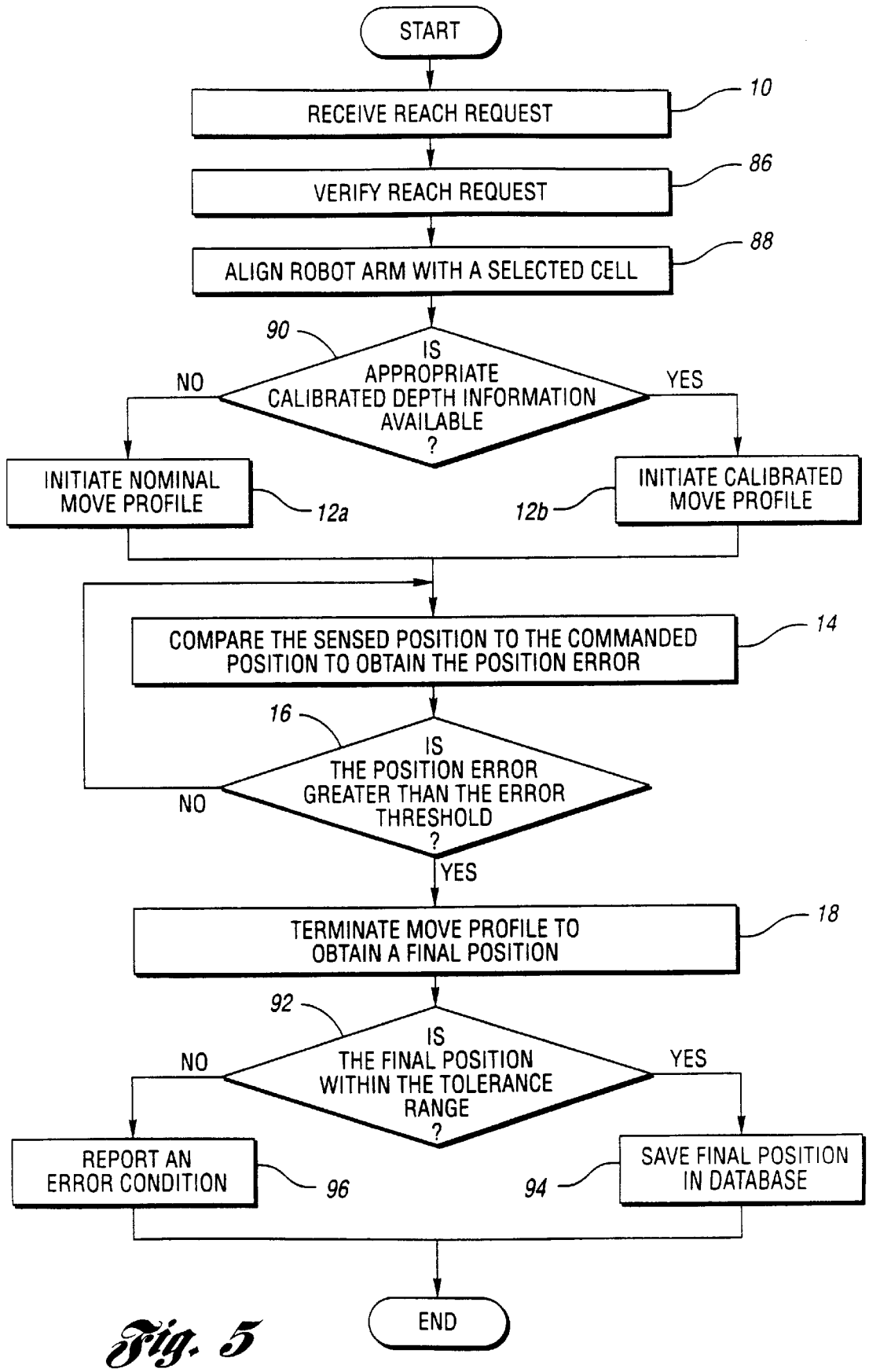
FIG. 5 is a flow chart detailing a preferred method of adaptive cartridge engagement in accordance with the present invention.

The flow chart of FIG. 5 summarizes a preferred method of cartridge engagement in accordance with the present invention. Reference numerals correspond with those described in reference to previous FIGS. 1–4 where applicable. As shown, the method commences when a request is received 10 to move a cartridge from a selected source cell 26' to a destination cell. Preferably, as shown in block 86, it is first verified that the move can be accomplished. Next, as shown in block 88, robot arm 30 is aligned with selected cell 26' by appropriate vertical and angular positioning.

Once robot arm 30 is aligned with selected cell 26', a move profile can be initiated 12 to extend reach mechanism 34 from starting position 74 toward cartridge 28'. In a preferred embodiment, either a nominal move profile 12a or a calibrated move profile 12b may be initiated, depending on the availability of appropriate cell depth information from database 64 as determined in block 90. During the move profile, the sensed position 76 of reach mechanism 34 is compared 14 with the commanded position 80 to obtain the position error. The position error is monitored to determine when it exceeds an error threshold, indicating engagement of reach mechanism 34 with cartridge 28'. Then, the move profile is terminated 18 to obtain a final position 82 of reach mechanism 34.

The final position 82 reflects the specific depth of selected cell 26' from robot arm 30. In a preferred embodiment, it is determined whether the final position 82 is within an acceptable tolerance range, as indicated at block 92. If so, as shown at block 94, the cell depth is stored in database 64. As indicated at block 96, cell depths outside of the predetermined tolerance range are reported as an error condition.

While embodiments of the invention have been illustrated and described, it is not intended that these embodiments illustrate and describe all possible forms of the invention. Rather, the words used are words of description rather than limitation, and it is understood that various changes may be made without departing from the spirit and scope of the invention.

What is claimed is:

1. A method for adaptively engaging cartridges stored in an automated cartridge library, the method comprising:

receiving a request to extend a reach mechanism of a robot arm to engage a cartridge stored in a selected cell;

initiating a move profile to extend the reach mechanism from a starting position toward the cartridge, the move profile comprising a set of commanded positions and corresponding commanded velocities;

comparing a sensed position of the reach mechanism with the commanded position to determine a position error;

maintaining the move profile until the position error exceeds an error threshold; and terminating the move profile to obtain a final position of the reach mechanism, wherein the final position reflects a specific depth of the selected cell from the robot arm.

2. The method of claim 1, further comprising verifying the request.

3. The method of claim 1, further comprising aligning the robot arm with the selected cell.

4. The method of claim 1, wherein initiating the move profile includes determining if calibrated depth information is available for the selected cell.

5. The method of claim 4, wherein determining if calibrated depth information is available includes accessing a database containing cell depth information.

6. The method of claim 4, wherein initiating the move profile includes initiating a nominal move profile if it is determined that appropriate calibrated depth information is not available for the selected cell.

7. The method of claim 6, wherein initiating the nominal move profile includes selecting a nominal move profile from a plurality of profiles based on the properties of the cartridge to be engaged.

8. The method of claim 4, wherein initiating the move profile includes initiating a calibrated move profile if it is determined that appropriate calibrated depth information is available for the selected cell.

9. The method of claim 1, further comprising determining when the commanded velocity is equal to a predetermined stall velocity.

10. The method of claim 1, wherein maintaining the move profile includes maintaining a predetermined stall velocity until the position error exceeds an error threshold.

11. The method of claim 1, further comprising determining if the final position is within a predetermined tolerance range.

12. The method of claim 11, wherein the step of determining includes saving the final position in a database if it is determined that the final position is within the predetermined tolerance range.

13. The method of claim 11, wherein the step of determining includes reporting an error condition if it is determined that the final position is not within the predetermined tolerance range.

14. An automated cartridge library, comprising:

a housing;

a plurality of storage cells located within the housing, each cell formed to hold a data cartridge;

a robot arm actuable within the housing, the robot arm having a reach mechanism for extending toward a selected cell;

a motor associated with the reach mechanism and operable to extend the reach mechanism toward the selected cell, the motor having a position feedback sensor for determining a sensed position of the reach mechanism;

a library controller for receiving a request to extend the reach mechanism to engage a cartridge stored in the selected cell and for initiating a move profile to extend the reach mechanism from a starting position toward the cartridge, wherein the move profile comprises a set of commanded positions and corresponding commanded velocities; and a motor controller in communication with the library controller for comparing the sensed position of the reach mechanism with the commanded position to determine a position error, maintaining the move profile until the position error exceeds an error threshold, and terminating the move profile to obtain a final position of the reach mechanism, wherein the final position reflects a specific depth of the selected cell from the robot arm.

15. The automated cartridge library of claim 14, wherein the library controller is operable to verify the request.

16. The automated cartridge library of claim 14, wherein the library controller is operable to determine if calibrated depth information is available for the selected cell.

17. The system of claim 14, wherein the library controller further comprises a database for storing cell depth information.

18. The system of claim 14, wherein the position feedback sensor comprises a position encoder.

19. The system of claim 14, wherein the motor controller is operable to determine when the commanded velocity is equal to a predetermined stall velocity.

20. The system of claim 14, wherein the library controller is operable to determine if the final position is within a predetermined tolerance range.

* * * * *